(12) United States Patent
Landino et al.

(10) Patent No.: US 9,321,435 B2
(45) Date of Patent: Apr. 26, 2016

(54) VALVE INTEGRATED PARK INHIBIT SOLENOID ASSEMBLY

(71) Applicant: GM Global Technology Operations LLC, Detroit, MI (US)

(72) Inventors: Christopher J. Landino, Sterling Heights, MI (US); Stephen W. Powell, South Lyon, MI (US); Todd R. Berger, Pinckney, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 570 days.

(21) Appl. No.: 13/670,948

(22) Filed: Nov. 7, 2012

(65) Prior Publication Data

US 2014/0123799 A1    May 8, 2014

(51) Int. Cl.
*H01H 3/06* (2006.01)
*B60W 10/18* (2012.01)
*B60T 1/06* (2006.01)
*B60T 1/00* (2006.01)
*F16H 63/34* (2006.01)

(52) U.S. Cl.
CPC ............ *B60T 1/062* (2013.01); *F16H 63/3483* (2013.01); *B60T 1/005* (2013.01); *F16H 63/3433* (2013.01); *Y10T 74/20024* (2015.01)

(58) Field of Classification Search
USPC .......................................... 74/335; 200/61.91
See application file for complete search history.

(56) References Cited

U.S. PATENT DOCUMENTS

| | | | |
|---|---|---|---|
| 3,840,088 A | 10/1974 | Marumo et al. | |
| 5,078,242 A | 1/1992 | Ratke et al. | |
| 5,179,868 A | 1/1993 | Thibeault | |
| 6,698,555 B2 | 3/2004 | Schafer et al. | |
| 6,701,797 B2 * | 3/2004 | Heuver | 74/473.18 |
| 6,983,668 B2 | 1/2006 | Powell et al. | |
| 8,053,691 B2 * | 11/2011 | Vernacchia et al. | 200/61.91 |
| 8,567,444 B2 * | 10/2013 | Marin et al. | 138/31 |
| 2004/0011609 A1 * | 1/2004 | Schmid | 188/265 |
| 2007/0284213 A1 | 12/2007 | Duhaime et al. | |
| 2009/0158877 A1 * | 6/2009 | Vernacchia et al. | 74/473.24 |
| 2011/0023647 A1 | 2/2011 | Engel et al. | |

FOREIGN PATENT DOCUMENTS

| | | |
|---|---|---|
| FR | 2960932 A1 | 12/2011 |
| GB | 1 357 236 | 6/1974 |
| GB | 1357236 | 6/1974 |
| JP | 61253224 | 11/1986 |
| JP | 1199035 | 8/1989 |
| JP | 2008128444 A | 6/2008 |
| JP | A-2008-128444 | 6/2008 |
| WO | WO2005090818 A1 | 9/2005 |

* cited by examiner

*Primary Examiner* — Ha D Ho

(57) ABSTRACT

A system for locking a Park device in a transmission in an out-of-Park mode of operation includes a valve body that defines a bore, a solenoid connected to the valve body, a lock feature disposed in the valve body and interconnected with the solenoid, and a servo piston disposed within the bore of the valve body. The servo piston has a detent and the servo piston is interconnected to the Park device and is moveable between a first position and a second position. The detent is radially aligned with the lock feature when the servo piston is in the first position. Activation of the solenoid locks the lock feature into the detent of the servo piston to lock the Park device of the transmission in the no-Park mode.

18 Claims, 3 Drawing Sheets

VALVE INTEGRATED PARK INHIBIT SOLENOID ASSEMBLY

FIELD

The present disclosure relates to a park inhibit solenoid assembly integrated into a valve body of a transmission, and more particularly to a valve integrated park inhibit solenoid assembly that enables electronic transmission range selection in a motor vehicle.

BACKGROUND

The statements in this section merely provide background information related to the present disclosure and may or may not constitute prior art.

A typical multiple speed transmission uses a combination of torque transmitting devices and gear sets to achieve a plurality of driving modes that include a plurality of out-of-Park driving modes and a Park mode. The out-of-Park driving modes generally include forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

The ETRS system includes various components that enable the out-of-Park mode and Park mode, including a Park inhibit solenoid assembly (PISA). The PISA is operable to prevent the transmission from undesirably shifting from the out-of-Park mode to the Park mode. While typical PISA's are useful for their intended purpose, the employment of ETRS systems within applications having heavier fluid pressures and forces, such as trucks and sport utility vehicles, as well as applications in cold weather, requires an increased ability to prevent undesirable engagement of the Park mode. Accordingly, there is a need in the art for a PISA that provides locking features to prevent undesirable engagement of the Park mode while minimizing the size and weight of the PISA.

SUMMARY

A system for locking a Park device in a transmission in an out-of-Park mode of operation is provided. The system includes a valve body that defines a bore, a solenoid connected to the valve body, a lock feature disposed in the valve body and interconnected with the solenoid, and a servo piston disposed within the bore of the valve body. The servo piston has a detent and the servo piston is interconnected to the Park device and is moveable between a first position and a second position. The detent is radially aligned with the lock feature when the servo piston is in the first position. Activation of the solenoid locks the lock feature into the detent of the servo piston to lock the Park device of the transmission in the no-Park mode.

In one aspect of the present invention the detent is a groove formed on an outer surface of the servo piston.

In another aspect of the present invention the detent has an angled front face.

In yet another aspect of the present invention the valve body includes a first fluid port that communicates with the bore on a first side of the servo piston and a second fluid port that communicates with the bore on a second side of the servo piston.

In yet another aspect of the present invention the servo piston includes a fluid passage in communication with the detent and with the second fluid port.

In yet another aspect of the present invention the first fluid port receives a no-Park hydraulic signal and the second fluid port receives a Park hydraulic fluid signal.

In yet another aspect of the present invention a servo piston spring is disposed within the bore between the servo piston and the valve body to bias the servo piston to the second position.

In yet another aspect of the present invention the lock feature includes a ball in contact with the servo piston and a lock spring disposed between an armature of the solenoid and the ball.

In yet another aspect of the present invention the armature, the lock spring, and the ball are coaxial.

In yet another aspect of the present invention a lever is in contact with the solenoid and with the lock feature.

In yet another aspect of the present invention the lock feature includes a ball in contact with the servo piston, a lock piston in contact with the lever, and a lock spring disposed between the ball and the lock piston.

In yet another aspect of the present invention an armature spring is disposed within the solenoid to bias the lock feature towards the servo piston.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
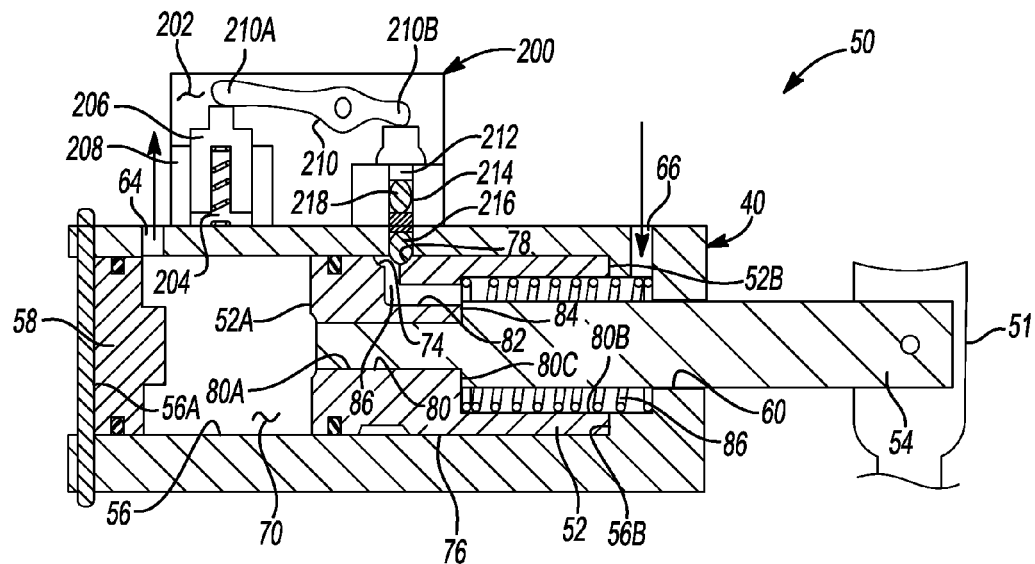
Figure 5:
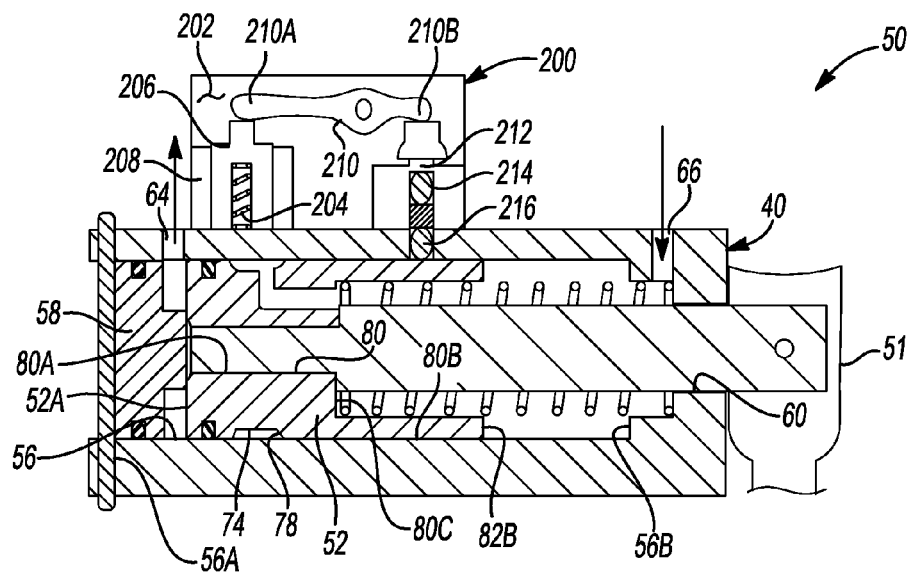

FIG. 4 is a schematic cross-sectional diagram of an alternate embodiment of a valve integrated Park inhibition solenoid assembly in an out-of-Park position according to the principles of the present invention; and FIG. 5 is a schematic cross-sectional diagram of the alternate embodiment of the valve integrated Park inhibition solenoid assembly in a Park position according to the principles of the present invention.

DETAILED DESCRIPTION

The following description is merely exemplary in nature and is not intended to limit the present disclosure, application, or uses.

Figure 1:
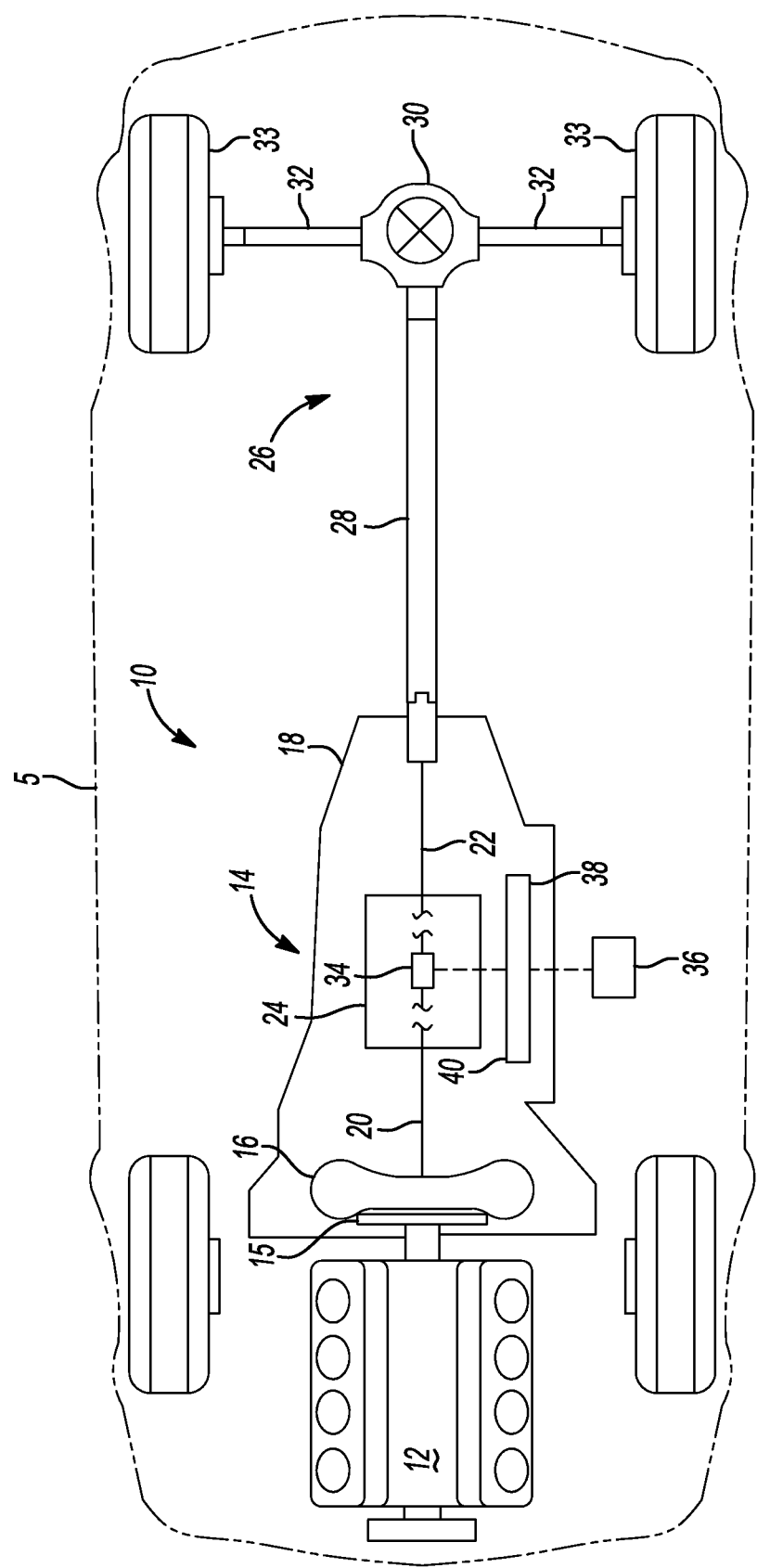
FIG. 1 is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed including a dry launch clutch.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control module 36. The control module 36 may be a transmission control module (TCM), an engine control module (ECM), or a hybrid control module, or any other type of controller. The control module 36 is preferably an electronic control device having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38.

The hydraulic control system 38 is disposed within a valve body 40 that contains most of the components of the hydraulic control system 38. These components include, but are not limited to, pressure regulation valves, directional valves, solenoids, etc. The valve body 40 may be attached to a bottom of the transmission housing 18 in the case of rear-wheel drive transmissions or attached to a front of the transmission housing 18 in the case of front-wheel drive transmissions. The hydraulic control system 38 is operable to selectively engage the clutches/brakes 34 by selectively communicating a hydraulic fluid from a sump (not shown) to a plurality of shift actuating devices (not shown). The hydraulic fluid is communicated to the shift actuating devices under pressure from either an engine driven pump or an accumulator.

Figure 2:
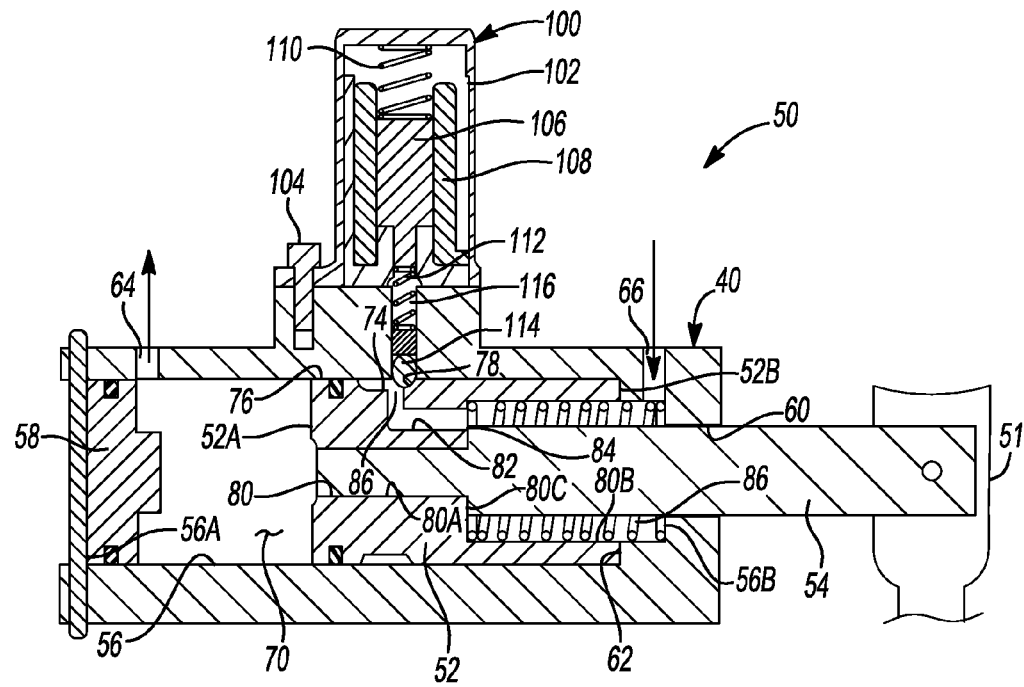
FIG. 2 is a schematic cross-sectional diagram of a valve integrated Park inhibition solenoid assembly in an out-of-Park position according to the principles of the present invention.

Turning to FIG. 2, a valve integrated Park inhibit solenoid assembly (VIPISA) for use in the hydraulic control system 38 is generally indicated by reference number 50. The VIPISA 50 is preferably employed in an electronic range selection (ETRS) subsystem within the transmission. An exemplary ETRS subsystem for use with the present invention is disclosed in commonly assigned U.S. Pat. No. 6,983,668, hereby incorporated by reference as if fully disclosed herein. The ETRS subsystem generally includes a plurality of servos, solenoids, valves, and a detent lever. An exemplary detent lever for use with the VIPISA 50 is generally indicated by reference number 51. The components of the ETRS system, including the detent lever 51, cooperate to shift the transmission between an out-of-Park mode that preferably includes a Neutral, forward, and reverse speed ratios and a Park mode. The Park mode is intended to prevent movement of the motor vehicle. The VIPISA 50 is operable to prevent the detent lever 51 from undesirably or unintentionally shifting between the out-of-Park mode and the Park mode, as will be described in greater detail below.

The VIPISA 50 includes a servo piston 52 and rod 54 slidably disposed within a bore 56 of the valve body 40. A first end 56A of the bore 56 is closed by a plug or stopper 58 while a second end 56B of the bore 56 includes an opening 60. The bore 56 also includes a stop surface 62 disposed proximate the second end 56B. An out-of-Park fluid port 64 formed in the valve body 40 communicates with the bore 56 proximate the first end 56A while a back-to-Park fluid port 66 formed in the valve body 40 communicates with the bore 56 proximate the second end 56B.

The servo piston 52 is slidably disposed within the bore 56 between the ports 64 and 66 and cooperates with the bore 56 to define two fluid chambers: a first fluid chamber 70 in communication with the first fluid port 64 and a second fluid chamber 72 in communication with the second fluid port 66. The servo piston 52 includes a first end 52A and a second end 52B opposite the first end 52A. The servo piston 52 includes a detent 74 located on an outer surface 76 of the servo piston 52. The detent 74 includes an angled front face 78. The detent 74 may be a single circumferential groove that extends along the entire circumference of the servo piston 52 or a plurality of discrete detents without departing from the scope of the present invention.

The servo piston 52 further includes a center, coaxial bore 80 having a first, small diameter portion 80A and a second, large diameter portion 80B. The first portion 80A extends from the first end 52A to a radial surface 80C located within the servo piston 52. The second portion 80B extends from the radial surface 80C to the second end 52B. A fluid channel 82 communicates from a port 84 in the radial surface 80C to a port 86 in the detent 74.

The rod 54 is coupled at one end to the servo piston 52 and at an opposite end to the detent lever 51. The rod 54 is press fit within the first portion 80A of the center bore 80 and extends out from the valve body 40 through opening 60. A biasing member or spring 86 is disposed around the rod 54 within the second portion 80B of the center bore 80. While the spring 86 is illustrated as a coiled spring in the present embodiment, it should be appreciated that any kind of biasing member may be employed without departing from the scope of the present invention. The spring 86 contacts the radial surface 80C and end 56B of the valve body 40 to bias the servo piston 52 to a Park position (shown in FIG. 2).

The VIPISA 50 also includes a solenoid latching system 100 connected to the valve body 40 and operable to directly engage the servo piston 52. The solenoid latching system 100 includes a solenoid 102 attached by a fixed connection 104 to the valve body 40. Generally, the solenoid 102 includes an armature 106 surrounded by a solenoid coil 108. The solenoid coil 108 is selectively energizeable to produce a magnetic force to move the armature 106. An armature spring 110 is disposed at one end of the armature 106 to bias the armature 106 towards the servo piston 52. A tolerance spring 112 is located at an opposite end of the armature 106 between the armature 106 and a lock ball 114. The lock ball 114 is disposed within a passage 116 in the valve body 40 that communicates with the bore 56. The lock ball 114 selectively engages the detent 74 of the servo piston 52. In the example provided, the armature 106, springs 110 and 112, and the lock ball 114 are all coaxially aligned. Therefore the armature spring 110 biases and pre-sets the lock ball 114 towards the detent 74 of the servo piston 52. The tolerance spring 112 at its free height preferably overtakes the armature spring 110. It should be appreciated that the lock ball 114 may be a ball bearing, roller, or formed end of a plunger without departing from the scope of the present invention.

Figure 3:
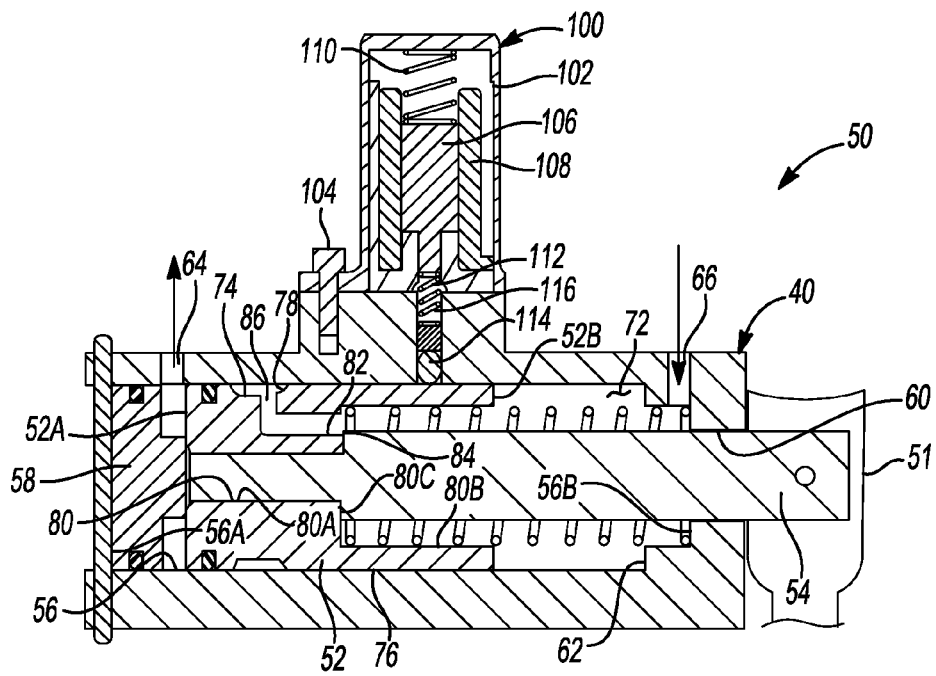
FIG. 3 is a schematic cross-sectional diagram of the valve integrated Park inhibition solenoid assembly in a Park position according to the principles of the present invention.

During operation, the detent lever 51 is moved by the ETRS system between the out-of-Park position, shown in FIG. 2, and the Park position shown in FIG. 3. Movement of the servo piston 52 between out-of-Park and Park positions in turn moves the detent lever 51. However the VIPISA 50 is operable to selectively lock the detent lever 51 in the out-of-Park position, shown in FIG. 2, by engagement of the solenoid latching assembly 100. For example, in the out-of-Park locked condition, the solenoid 102 is activated and the armature 106 pushes the lock ball 114 into the detent 74 of the servo piston 52. The lock ball 114 reacts against the angled face 78 of the detent 74 to prevent the servo piston 52 from translating. To unlock the servo piston 52, the solenoid 102 is deenergized and the servo piston 52 moves to the left due to the bias of the spring 86 and movement of the detent lever 51. As the servo piston 52 translates, the lock ball 114 rides up the angled face 78 of the detent 74 and enters the passage 116, shown in FIG. 3. In addition, hydraulic fluid from the ETRS system enters fluid chamber 72 via port 66, enters the servo piston 52, and communicates through the fluid passage 82 to contact the locking ball 114. In the event that the armature 106 has failed and locked, this hydraulic fluid pressure acts on the locking ball 114 and moves the locking ball 114 against the bias of the tolerance spring 112 to an unlocked condition, thus allowing the VIPISA 50 to return to Park. To return to the out-of-Park condition, the servo piston 52 moves the detent lever 51 while hydraulic fluid from the ETRS system enters the first fluid chamber 70 via fluid port 64 and contacts the servo piston 52 to assist in the movement of the servo piston 52 to the out-of-Park condition.

Turning to FIGS. 4 and 5, an alternate embodiment of a VIPISA is shown and generally indicated by reference number 50'. The VIPISA 50' is substantially similar to the VIPISA 50 shown in FIGS. 2 and 3 and like components are indicated by like reference numbers. However, the VIPISA 50' includes a mechanically assisted solenoid latching assembly 200. The mechanically assisted solenoid latching assembly 200 operates in a manner similar to that of the solenoid latching assembly 100 to selectively lock the servo piston 52 in the out-of-Park mode. The mechanically assisted solenoid latching assembly 200 includes a solenoid 202 attached to the valve body 40. Generally, the solenoid 202 includes an armature 206 surrounded by a solenoid coil 208. The solenoid coil 208 is selectively energizeable to produce a magnetic force to move the armature 206. An armature spring 209 is disposed at one end of the armature 206 to bias the armature 206 away from the servo piston 52. The mechanically assisted solenoid latching assembly 200 further includes a lever 210 that mechanically assists the armature 206. The lever 210 includes a first lever arm 210A that contacts the armature 206 and a second lever arm 210B that contacts a piston 212. The first lever arm 210A is preferably longer than the second lever arm 210B. The piston 212 is in contact with a tolerance spring 214 disposed between the piston 212 and a lock ball 216. The lock ball 216 is disposed within a passage 218 in the valve body 40 that communicates with the bore 56. The lock ball 216 selectively engages the detent 74 of the servo piston 52. The armature 206 and armature spring 209 are coaxially aligned while the piston 212, the tolerance spring 214, and the lock ball 216 are coaxially aligned. Therefore the armature spring 209 biases and pre-sets the lock ball 216 through the lever 210 and the piston 212 towards the detent 74 of the servo piston 52. FIG. 4 illustrates the VIPISA 50' in an out-of-Park mode while FIG. 5 illustrates the VIPISA 50' in a Park mode. In yet another embodiment, the VIPISA 50' may omit the armature spring 209 such that the mechanically assisted solenoid latching assembly 200 does not pre-stage the lock ball 216. The tolerance spring 214 at its free height preferably overtakes the armature spring 209.

The description of the invention is merely exemplary in nature and variations that do not depart from the gist of the invention are intended to be within the scope of the invention. Such variations are not to be regarded as a departure from the spirit and scope of the invention.

The following is claimed:

1. A system for locking a Park device in a transmission in a no-Park mode of operation, the system comprising:
    a valve body that defines a bore;
    a solenoid connected to the valve body;
    a lock feature disposed in the valve body and interconnected with the solenoid; and
    a servo piston disposed within the bore of the valve body, the servo piston having a detent disposed on an outer surface of the servo piston, wherein the detent is shaped as a groove having an angled front face, wherein the servo piston is interconnected to the Park device and is moveable between a first position and a second position, wherein the detent is radially aligned with the lock feature when in the first position, and
    wherein the solenoid and the lock feature are coaxial and angled relative to the servo piston and activation of the solenoid locks the lock feature into the detent of the servo piston to lock the Park device of the transmission in the no-Park mode.

2. The system of claim 1 wherein the valve body includes a first fluid port that communicates with the bore on a first side of the servo piston and a second fluid port that communicates with the bore on a second side of the servo piston.

3. The system of claim 2 wherein the servo piston includes a fluid passage in communication with the detent and with the second fluid port.

4. The system of claim 3 wherein the first fluid port receives a no-Park hydraulic signal and the second fluid port receives a Park hydraulic fluid signal.

5. The system of claim 1 further comprising a servo piston spring disposed within the bore between the servo piston and the valve body to bias the servo piston to the second position.

6. The system of claim 1 wherein the lock feature includes a ball in contact with the servo piston and a lock spring disposed between an armature of the solenoid and the ball.

7. The system of claim 6 wherein the armature, the lock spring, and the ball are coaxial.

8. The system of claim 1 further comprising a lever in contact with the solenoid and with the lock feature.

9. The system of claim 8 wherein the lock feature includes a ball in contact with the servo piston, a lock piston in contact with the lever, and a lock spring disposed between the ball and the lock piston.

10. The system of claim 1 further comprising an armature spring disposed within the solenoid to bias the lock feature towards the servo piston.

11. A system for locking a Park device in a transmission in no-Park mode of operation, the system comprising:
a valve body that defines a bore, the valve body having a first fluid port in communication with the bore and a second fluid port in communication with the bore;
a solenoid connected to the valve body;
a lock feature disposed in the valve body between the first and second fluid ports and interconnected with the solenoid; and
a servo piston slidably sealed within the bore between the first and second fluid ports, the servo piston having a detent and defining a fluid passage in communication with the detent and with the second fluid port, wherein the servo piston is interconnected to the Park device and is moveable between a first position and a second position, wherein the detent is radially aligned with the lock feature when in the first position, and
wherein activation of the solenoid locks the lock feature into the detent of the servo piston to lock the Park device of the transmission in the no-Park mode and wherein hydraulic fluid from the second fluid port communicates through the fluid passage to unseat the lock feature within the detent.

12. The system of claim 11 wherein the detent includes a bottom surface and a front angled face, and wherein the fluid passage communicates with the bottom surface of the detent.

13. The system of claim 12 wherein the servo piston defines a center bore with an open end and wherein the fluid passage communicates with the second fluid port through the center bore and the open end.

14. The system of claim 13 further comprising a servo piston spring disposed within the center bore of the servo piston and the bore of the valve body to bias the servo piston to the second position.

15. The system of claim 14 wherein the first fluid port receives a no-Park hydraulic signal and the second fluid port receives a Park hydraulic fluid signal.

16. The system of claim 11 wherein the lock feature includes a ball in contact with the servo piston and a lock spring disposed between an armature of the solenoid and the ball.

17. The system of claim 11 further comprising a lever in contact with the solenoid and with the lock feature, and wherein the lock feature includes a ball in contact with the servo piston, a lock piston in contact with the lever, and a lock spring disposed between the ball and the lock piston.

18. A transmission for a motor vehicle comprising:
a transmission case;
a clutch and gear arrangement supported within the transmission case;
a detent lever for placing the transmission into a Park mode and a no-Park mode;
a valve body coupled to the transmission case, wherein the valve body defines a bore and has a first fluid port in communication with the bore and a second fluid port in communication with the bore;
a solenoid connected to the valve body;
a lock feature disposed in the valve body between the first and second fluid ports and interconnected with the solenoid;
a servo piston slidably sealed within the bore between the first and second fluid ports, the servo piston having a detent and defining a fluid passage in communication with the detent and with the second fluid port, wherein the servo piston is moveable between a first position and a second position, wherein the detent is radially aligned with the lock feature when in the first position; and
a rod coupled to the servo piston and extending out from the valve body and coupled to the detent lever; and
wherein activation of the solenoid locks the lock feature into the detent of the servo piston to lock the detent lever of the transmission in the no-Park mode and wherein hydraulic fluid from the second fluid port communicates through the fluid passage to unseat the lock feature within the detent.

* * * * *